Figure 1:
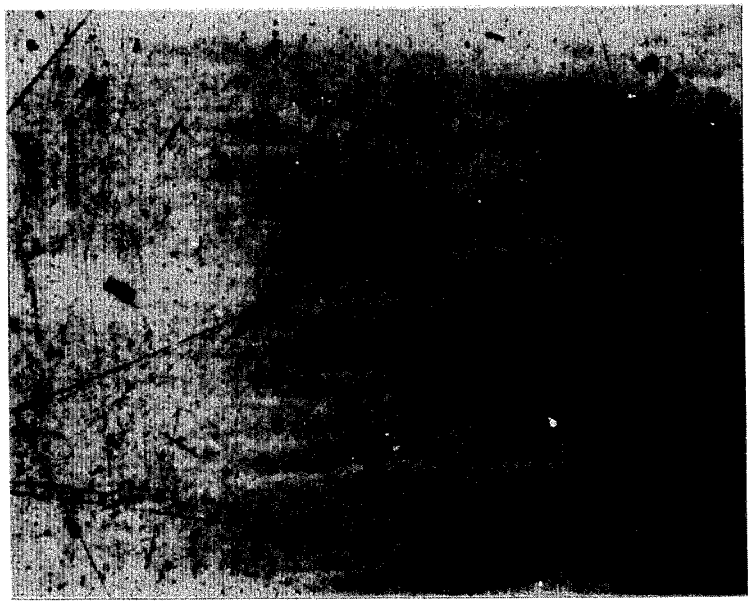

United States Patent [19]

Brown et al.

[11] 4,046,305

[45] Sept. 6, 1977

[54] METALLIC BONDING METHOD

[75] Inventors: Dennis Cockburn Brown; Reginald Murray, both of Leamington Spa, England

[73] Assignee: Associated Engineering Limited, England

[21] Appl. No.: 626,126

[22] Filed: Oct. 28, 1975

[30] Foreign Application Priority Data

Nov. 15, 1974 United Kingdom .............. 49480/74

[51] Int. Cl.² ............................................ B23K 35/30
[52] U.S. Cl. .................................. 228/194; 228/135; 228/174; 228/195; 228/198; 428/654
[58] Field of Search .............. 228/198, 135, 140, 193, 228/194, 195, 174; 29/197.5

[56] References Cited

U.S. PATENT DOCUMENTS

| 3,148,038 | 9/1964 | Wolfe | 228/193 |
| 3,180,022 | 4/1965 | Briggs | 228/198 |
| 3,703,032 | 11/1972 | Batista | 228/194 |
| 3,708,866 | 1/1973 | Wells | 228/194 |
| 3,766,633 | 10/1973 | Lehrheuer et al. | 228/135 |

Primary Examiner—James L. Jones, Jr.
Assistant Examiner—K. J. Ramsey
Attorney, Agent, or Firm—Brisebois & Kruger

[57] ABSTRACT

Bonded metallic structures comprising at least two pieces each of a metallic aluminous substance selected from the group consisting of aluminium and aluminium alloys are formed by bonding the pieces together by eutectic diffusion bonding using a metallic interlayer material which is applied between the surfaces to be joined, which forms a less stable oxide than that formed by the aluminous substance and which is preferably selected from the group consisting of copper and copper-rich alloys including at least about 95% copper.

22 Claims, 12 Drawing Figures

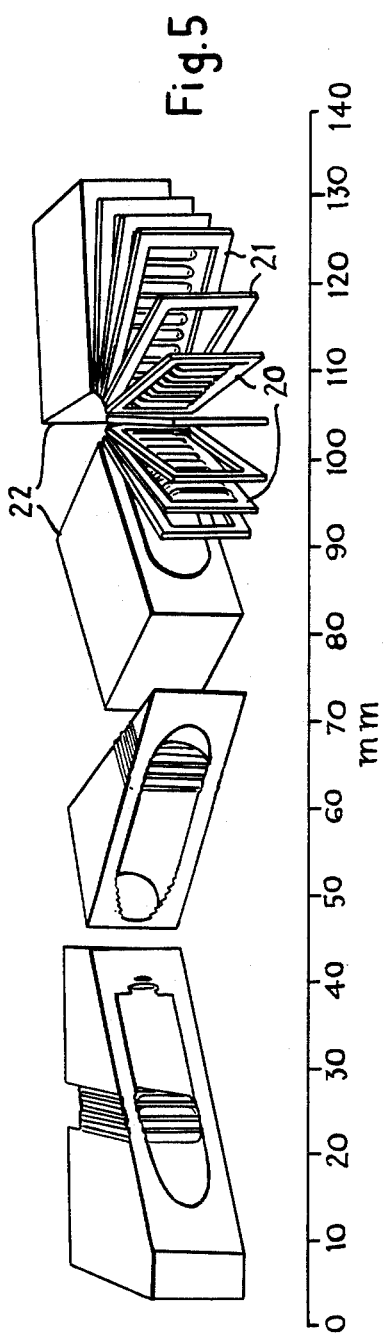
Fig.5
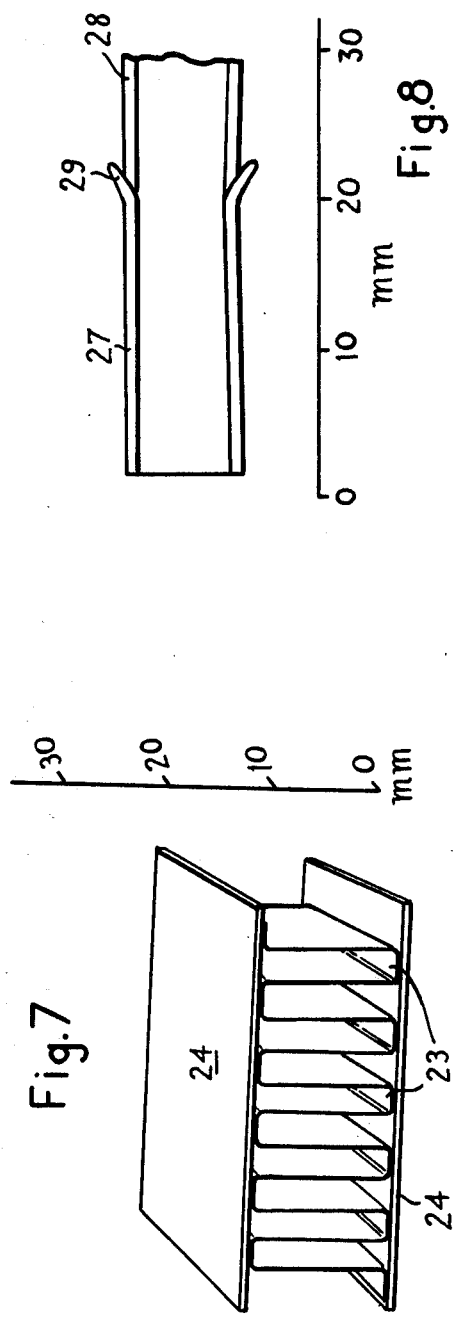
Fig.8
Fig.7

METALLIC BONDING METHOD

This invention relates to the bonding of metals or metal alloys and more particularly to diffusion bonding and a method of diffusion bonding aluminium or aluminium alloy components to one another. The invention also concerns bonded structures produced by the diffusion bonding method.

The problems of joining aluminium and aluminium alloys by welding, brazing and soldering are due in the main to the tenacious oxide layer formed on the surface of the aluminium or aluminium alloy at atmospheric temperatures. In fusion welding and cold pressure welding of aluminium or aluminium alloys, the melting or gross deformation encountered cannot always be tolerated. In soldering and brazing techniques, which involve the use of fluxes, the fluxes have subsequently to be removed by costly washing-out procedures resulting in expensive flux loss as well as in contamination of the washing-out water; also incomplete washing-out may result in corrosion problems. In fluxless brazing techniques the use of expensive high-vacuum furnaces with a very poor through-put is necessary. Moreover, with brazing the temperature control is very critical since it is necessary to work very close to the melting point of the aluminium or aluminium alloy.

The term aluminium alloys in this specification includes composites consisting mainly of aluminium or aluminium alloy, the other component being, for example, alumina.

From one aspect, the invention consists in a bonded structure comprising two or more pieces of aluminium or aluminium alloy, characterised in that the pieces have a metallurgical bond therebetween formed by eutectic diffusion bonding using an interlayer applied between the surfaces to be joined, the interlayer being of a metal material which is readily soluble in the aluminium or aluminium alloy, which forms a eutectic with the aluminium or aluminium alloy, and which forms a less stable oxide layer at atmospheric temperature than that formed by the aluminium or aluminium alloy.

From another aspect, the invention consists in a method of bonding two or more pieces of aluminium or aluminium alloy, characterised in that the pieces are bonded together by eutectic diffusion bonding using an interlayer applied between the surfaces to be joined, the interlayer being of a metal material which is readily soluble in the aluminium or aluminium alloy, which forms a eutectic with the aluminium or aluminium alloy, and which forms a less stable oxide layer at atmospheric temperatures than that formed by the aluminium or aluminium alloy, thereby to form a metallurgical bond between the said pieces.

The metal material interlayer may be either deposited on at least one of the surfaces to be joined or be in the form of a foil which is inserted between the surfaces to be joined.

From yet another aspect, the invention consists in a method of bonding together two or more pieces of aluminium or aluminium alloy, said method comprising depositing on at least one of the surfaces to be joined a layer of a metal material, or inserting between the surfaces to be joined a foil layer of a metal material, which material is readily soluble in the aluminium or the aluminium alloy, which forms a eutectic with the aluminium or aluminium alloy, and which forms a less stable oxide layer at atmospheric temperatures than that formed by the aluminium or aluminium alloy, pressing together the surfaces to be joined and heating the pieces in a protective atmosphere to a maximum temperature at least equal to the eutectic temperature of the combination of the layer material and the aluminium or aluminium alloy but below the melting point of the aluminium or aluminium alloy, whereby the layer material diffuses into the aluminium or aluminium alloy to form a metallurgical bond consisting of an alloy of aluminium or aluminium alloy and layer material between the joined pieces.

In such eutectic bonding there is believed to be a first or solid phase involving simple solid-state diffusion of atoms across the interface between the surfaces to be joined, in the early stages of the bonding process, during heating, at isolated points on the joint interface resulting in the formation of an alloy of interlayer material and aluminium or aluminium alloy, in the solid state. Since the surfaces to be bonded, on a micro-scale, are composed of many minute peaks and hollows, when these surfaces are brought into contact with one another, the pressure loading is sufficient at the point of contact to introduce many small points of plastic deformation. This disrupts the oxide layers at these points of deformation and allows the mutual metal/metal contact required for the solid-state diffusion phase.

A second or liquid phase in eutectic bonding occurs when the bonding temperature rises to or above that of the eutectic of the alloys formed during the solid-state phase, when atom diffusion occurs more rapidly both within the liquid phase and across the liquid and solid phase interfaces. The ultimate solid metallurgical bond may form either at the bonding temperature due to further diffusion or on cooling, dependent on the nature of the metal system involved.

The nature of the eutectic bond is such that with pieces of the same material, the interface between the bonded pieces virtually disappears, for example commercially pure aluminium pieces can be eutectically diffusion bonded using a copper interlayer and after bonding the copper will be largely diffused into the aluminium. The original interfaces will have virtually disappeared, leaving a bond with a strength of the same order as or greater than that of the parent material. Such is not the case with bonds produced by brazing and soldering where the interfaces between the bonded pieces clearly remain.

Deformation and extrusion of molten metal at the bond are virtually negligible and, unlike brazing, the method of the invention is entirely fluxless.

Since molten metal is formed at the interface of the metal pieces being bonded, surface preparation does not have to be of the very high standard which is required for known diffusion bonding processes and thus can be of a commercially available surface finish, i.e. a surface finish of 20 to 50 micro inches CLA (centre line average). Thus, the need for very smooth surfaces is eliminated and the presence of the molten metal at the interface means that the contact pressures need not be so high. Furthermore, in contrast to known diffusion bonding processes which, essentially, must be carried out in a high vacuum furnace the process of the invention can be carried out under environmental conditions other than vacuum conditions, i.e. at atmospheric pressure or positive pressure, so that expensive high-vacuum furnaces are not required.

Preferably, the interlayer material is copper or a copper-rich alloy. In this specification, the term "copper-rich alloy" means a copper alloy including at least about 95% copper. Suitable copper rich alloys include copper with up to 5% zinc. When copper or copper-rich alloy is used as the interlayer material, the copper or copper-rich alloy is preferably electro-chemically deposited in any suitable manner on one or each of the surfaces to be joined, prior to the pressure and heat treatment.

With copper or a copper-rich alloy as the interlayer material, the method of the invention is applicable to any of a large number of aluminium alloys with which copper or copper-rich alloy will form a eutectic, i.e. excluding those aluminium alloys with a very low melting point.

The pressure and heat treatment is conveniently carried out in a controlled (protective) atmosphere furnace, which may be formed by pumping argon through the furnace. When the pieces are heated in contact under pressure, it is believed that the metal interlayer material and aluminium or aluminium alloy diffuse into each other at a rate increasing exponentially with temperature. This forms a metal interlayer material/aluminium alloy in the solid state in the interface region and when, eventually the temperature rises above that of the eutectic point of the interlayer material/aluminium or interlayer material/aluminium alloy system, melting of the formed alloy (confined only to this region) will occur. This molten alloy flows, filling up any small irregularities in the mated surfaces, and a metallurgical bond is formed. With further heating, diffusion of the metal interlayer material in the aluminium or aluminium alloy continues, gradually altering the composition of the interlayer material/aluminium alloy transition layer in the region of the original interface. Once the maximum temperature has been attained cooling can then commence, the assembly being removed from the furnace at a temperature below the eutectic temperature.

The upper limit of the temperature range is set by the need to avoid melting of the aluminium or aluminium alloy pieces whereas the lower limit of the temperature range is the lowest temperature at which the aluminium or aluminium alloy-interlayer material eutectic is formed. In the cases where aluminium is bonded with aluminium alloy and where aluminium alloys are bonded together the lower temperature is determined by the lower or lowest melting point piece.

The thickness of the copper or copper rich alloy interlayer or layers is conveniently in the range of 0.0013 mm to 0.013 mm (0.00005 inch to 0.0005 inch) and is preferably 0.003mm (0.0001 inch). The contact pressure may be in the range from 0.035 $MNm^{-2}$ to 2.8 $MNm^{-2}$ (5 to 400 lb/in$^2$) but preferably is of the order of 1.4$MNm^{-2}$ (200 lb/in$^2$). The preferred temperature range is 560° to 640° C for commercially pure aluminium. The temperature for aluminium alloys will depend upon the composition of the aluminium alloy used, for example with LM 13 (Lo-Ex) alloy comprising typically 0.7 to 1.5% Cu, 0.8 - 1.5% Mg, 10–12% Si, 1% max Fe, 0.5% max Mn, 1.5% max Ni, 0.5% max Zn, 0.1% max Pb 0.12 max Sn 0.2% max Ti and the remainder Al, the preferred temperature range is 515° to 530° C. The heating time may be any convenient time up to 30 minutes and the temperature holding time i.e. the time at which the pieces are at maximum temperature may vary between zero and 30 minutes. The combination of interlayer thickness, pressure, temperature, and temperature holding time used will depend upon the nature and form of the metals or metal alloys used.

The pressure may be applied to the pieces by rams, a furnace press, or other similar means. Alternatively, the pieces may be subjected to pressure by means of a differential expansion jig so designed and arranged that on heating to a sufficiently high temperature to achieve the diffusion bonding, the necessary pressure is applied.

Two pieces to be bonded, for example of a piston, may be provided with corresponding screw-threads on the surfaces to be joined and at least one of the screw-threaded surfaces provided with the interlayer material interposed between the screw-threaded surfaces the contact pressure being provided by the action of screwing up the thread.

One piece to be bonded may be provided with grooving in the surface to be joined, the grooving being closed by another piece in the form of a plate.

The metal pieces may be of various forms, for example the metal plate elements of plate type heat exchangers; radiator fins and half tubes; flared tube joints; castings, and a wide variety of bonded structures or components may be produced such as multi-part cylinder head castings for example of LM 13 alloy, cylinder blocks, gear box housings, galleried pistons, and hollow plating, for example for armoured vehicles.

The invention also consists in bonded structures or components produced by the diffusion bonding method.

Figure 2:
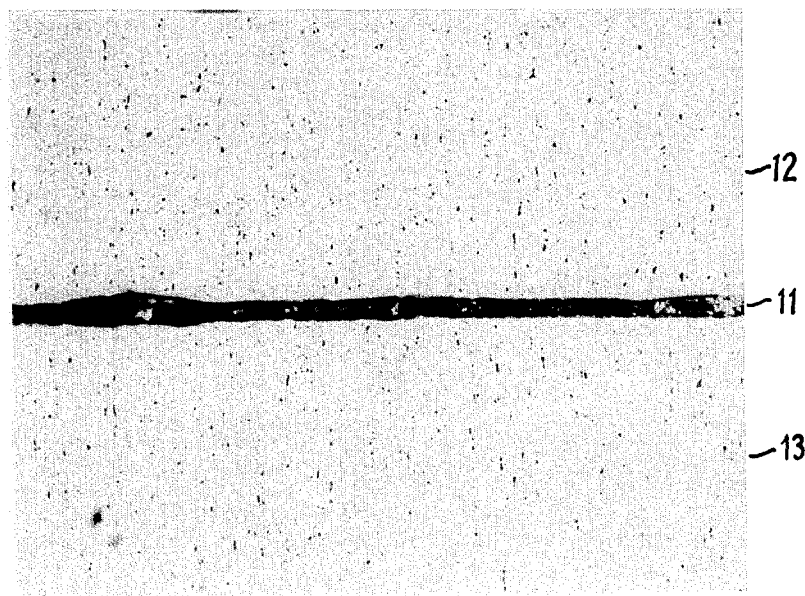
Figure 3:
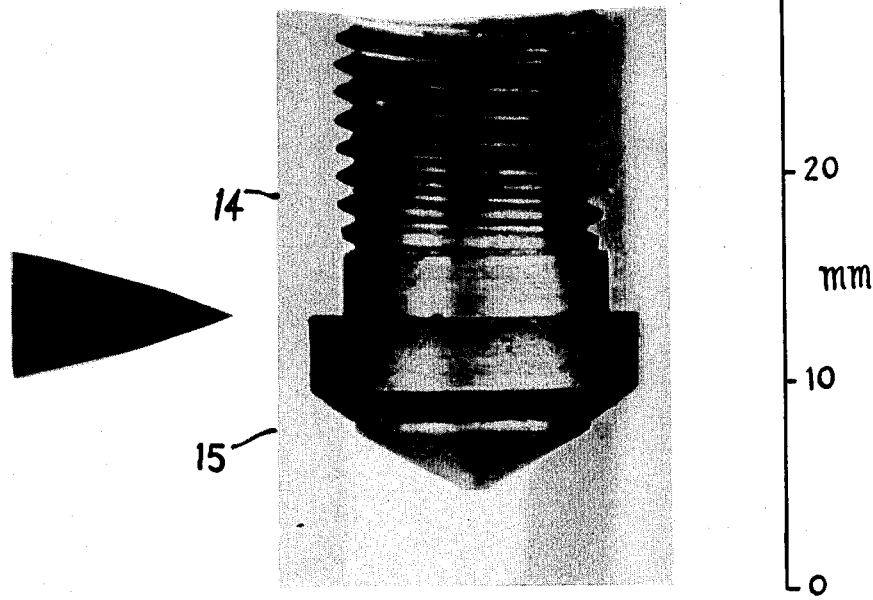
Figure 10:
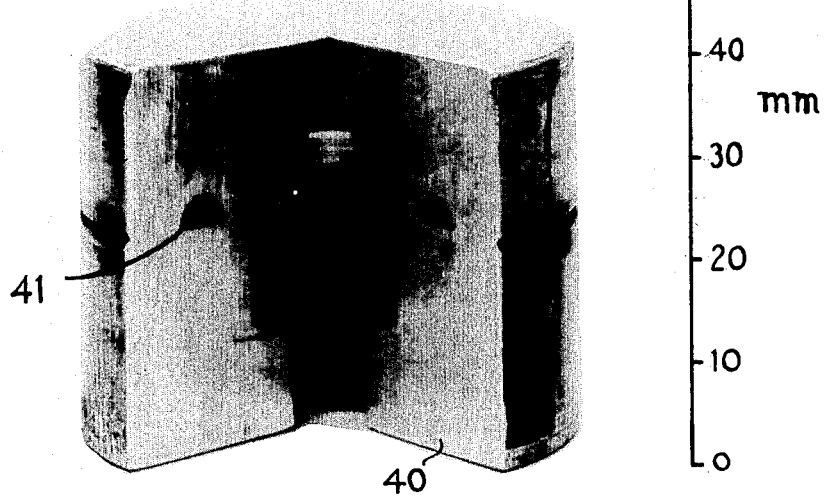
Figure 4:
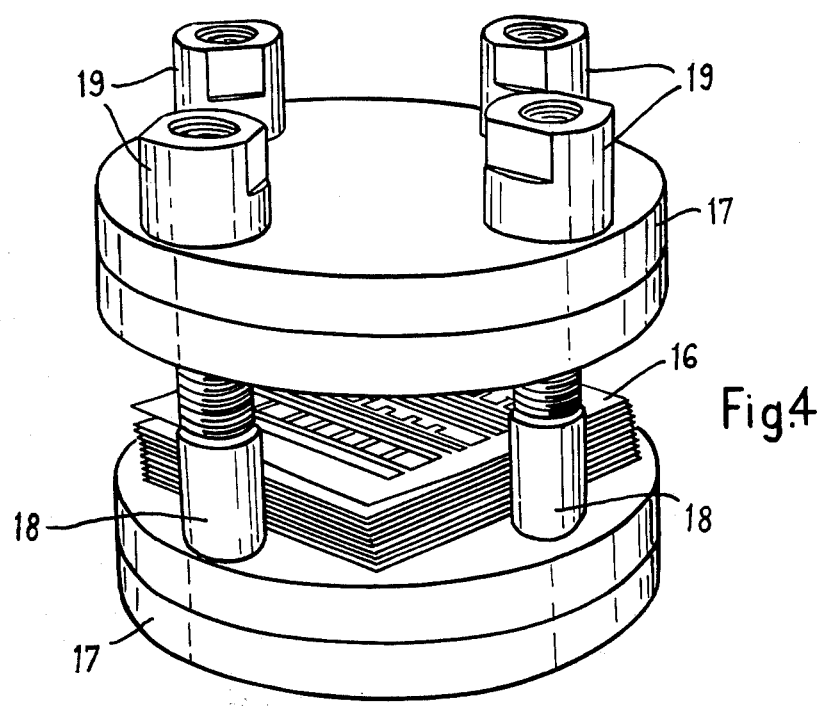
Figure 6:
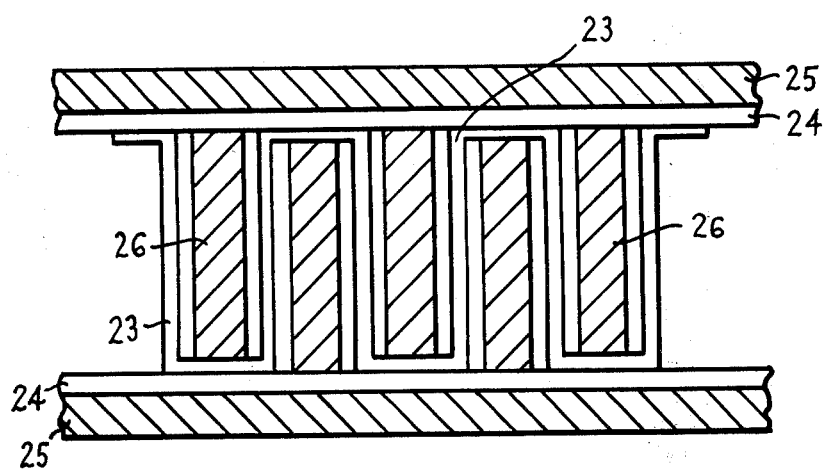
Figure 9:
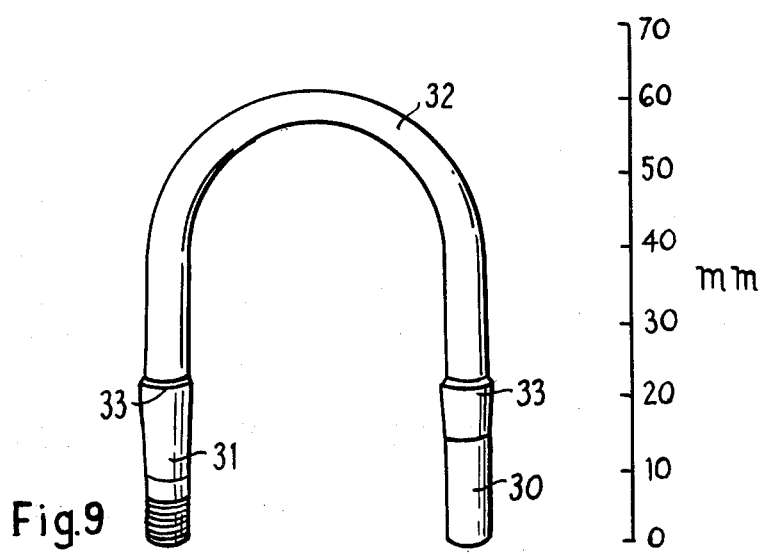
Figure 11:
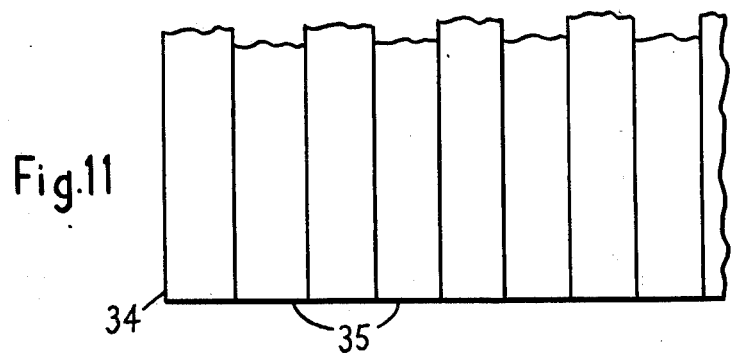
Figure 12:
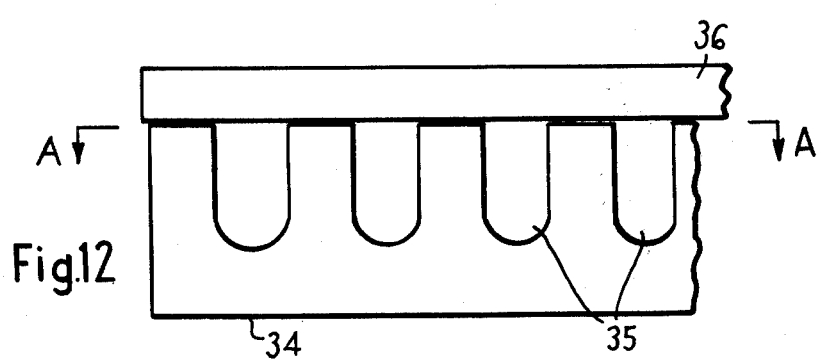

The invention will now be further described, by way of example, with reference to the accompanying drawings, in which:

FIG. 1 is a section through a eutectic diffusion bonded joint produced by the method of this invention, at a magnification of 75 X, FIG. 2 is a section through a typical soldered joint at a magnification of 75 X for comparison purposes, FIG. 3 is a section through a typical eutectic diffusion bonded structure, in accordance with the invention, FIG. 4 is a differential expansion jig showing typical perforated type plates, FIG. 5 shows a sectioned eutectic diffusion bonded plate heat exchanger, and an exploded view of the components before bonding, FIG. 6 is a diagrammatic view of a jig for applying pressure to form bonds between a corrugated fin and two half tubes of aluminium or aluminium alloy, FIG. 7 is a section of a eutectic-diffusion-bonded fin and half-tube structure formed in the jig of FIG. 6, FIG. 8 is a section through a eutectic-diffusion-bonded flared tube joint, FIG. 9 is a return bend eutectic-diffusion-bonded to two flared tubes, FIG. 10 is a section through a bonded structure containing internal cavities, FIG. 11 is a section along the line A—A of the composite aluminium plate shown in FIG. 12, and FIG. 12 is a diagrammatic side view of the plate of FIG. 11.

The invention will also be further described with reference to the following examples taken in conjunction with the drawings.

EXAMPLE I

A number of test specimens were prepared in the following way. The surfaces to be joined of a plurality of pieces of 19 millimeters (0.75 inches) in diameter made of commercially pure aluminium were turned flat and parallel on a lathe to a surface finish of about 0.0013 mm (50 microinches) CLA value. The surfaces were then degreased and cleaned for 5 to 10 seconds in a hot alkaline solution (60° C). After cleaning the pieces were rinsed in distilled water and transferred to a plating bath where they were immersed in a copper plating solution. The anode in the bath was of copper and the pieces were the cathode. The pieces were immersed in the plating solution for sufficient time to deposit a layer 0.003 mm (0.0001 inch) thick. Finally, the pieces were washed in water and acetone. A number of pieces were then butted together in pairs and subjected to heat and pressure treatment in a furnace through which argon was pumped. The maximum heating temperature was 600° C and the resultant protective atmosphere in the furnace was not completely inert, there being enough air remaining to render it slightly oxidising. The pieces were then held at this temperature for thirty minutes and then allowed to cool to a temperature below that of the eutectic point before being removed from the furnace. Throughout the heating cycle contact pressure was maintained at 1.4 MNm$^{-2}$ (200 lbs/sq. inch) by means of a furnace press.

The ultimate tensile strengths of the resultant bonds, herein referred to as bond strength, was determined in each case by turning the bonded specimens down to dumb-bell type tensile specimens (Hounsfield specimen, size No. 16) which were then tested on a Hounsfield Tensometer. For all the bonded components the bond strength was found to be of the order of the ultimate tensile strength of the aluminium itself, i.e. 82 MNm$^{-2}$ (5.3 Tons/in$^2$). A photomicrograph taken of a cross-section through the bond showed that the interface between the pieces had disappeared completely as illustrated in FIG. 1. In contrast, in the photomicrograph of the soldered joint shown in FIG. 2 the interface 11 between the bonded pieces 12, 13 of aluminium is clearly apparent.

EXAMPLE II

Similar specimens were produced under the same conditions as above, except that the time for which the contact pressure was maintained at maximum temperature was progressively reduced. It was found that it was not necessary to maintain the contact pressure for a finite time after reaching maximum temperature to achieve similar bond strengths to that of Example I.

EXAMPLE III

Test specimens were produced as in Examples I and II except that only one of the surface to be joined was copper plated with a single layer of copper of 0.001mm to 0.01mm thickness; again, the bond strength was found to be similar to that of Example I.

EXAMPLE IV

Tensile strength tests were then performed on specimens prepared as in Examples I and II with different thicknesses of copper to determine the effect of variation in bond strength with the thickness of copper plating on both the surfaces to be bonded. In all cases the pressure applied throughout the cycle was 1.4MNm$^{-2}$ (200lbs/in$^2$) and the specimens were heated up to a maximum temperature of 600° C, after which heating was immediately terminated, i.e. with zero temperature holding time, and the specimens allowed to cool. It was found that within the range of copper thicknesses investigated, i.e. from 0.001mm up to 0.015 mm, there was no significant variation of bond strength, the fracturing values bring close to the ultimate strength of the aluminium.

EXAMPLE V

In tests similar to that of Example IV with specimens prepared as in Example I, but coated on only one face, similar results were obtained. Coating on one face has the advantage that the quantity of copper used is reduced. Bonds have been produced in this way using 0.003 mm (0.0001 inch) thickness of copper. With such bonds the extrusion at the bond was negligible. A typical example of a bonded structure formed from two parts 14, 15 produced with such a quantity of copper is shown in FIG. 3, in which the arrow points to the bond; it will be seen that the joint line is free from extruded metal.

EXAMPLE VI

In tensile strength tests carried out on test specimens prepared as in Example III with a copper facing of 0.003 mm (0.0001 inch) thick, but bonded at varying temperatures within the range of 560° to 640° C, the upper limit being set by the amount of deformation tolerable, it was found that bond strengths of the order of the ultimate tensile strength of aluminium were produced.

EXAMPLE VII

Tensile strength tests performed on specimens produced as in each of Examples I to III, but with variations in the contact pressure between 0.035 MNm$^{-2}$ (5 lb/in$^2$) and 2.8 MNm$^{-2}$ (400 lb/in$^2$) did not exhibit any significant decrease in bond strength for these pressure ranges.

EXAMPLE VIII

Specimens were prepared in a similar manner as in Example I except that only one of the surfaces was copper plated, and instead of a furnace press, the aluminium pieces to be bonded were mounted in the differential expansion jig shown in FIG. 4. The jig, being made of stainless steel EN58, has a coefficient of expansion which is less than that for aluminium.

The aluminium pieces 16 are placed between and in contact with the two end plates 17, which are held together by four bolts 18 of stainless steel, secured by nuts 19. No pre-loading of the jig was applied, other than having the nuts 19 finger tight. The jigs and specimens were heated up to 600° C in a controlled atmosphere, resulting in the aluminium expanding more than the steel jig, thereby applying the necessary contact pressure.

Examination of the bond revealed that the deformation introduced was only 0.4% and the bond strength was found to be 77 MNm$^{-2}$ (5 tons/in$^2$), close to the ultimate tensile strength of aluminium. Such a jig may be used for the purpose of bonding the plates of plate type heat exchangers, and obviates the need for the furnace to be provided with a press. The jig also serves to locate the plates.

EXAMPLE IX a small slitted plate heat exchanger shown in FIG. 5 was produced using a differential expansion jig such as shown in FIG. 4, the heat exchanger having a plurality of perforated 12mm × 24 mm (0.47 inch × 0.95 inch) aluminium plates 20 separated by aluminium spacers 21, the plates and spacers being respectively 0.38 mm (0.015 inch) and 0.91 mm (0.036 inch) thick. A thickness of 0.003 mm (0.0001 inch) of copper was plated on the spacers, and then bonding was carried out using the same conditions of temperature and pressure as in Example I (i.e. a maximum temperature of 600° C and a contact pressure of 1.4 MNm$^{-2}$). Aluminium manifolds 22 were also bonded on to the end plates during the above heat and pressure treatment cycle. The heat exchanger thus produced was found to be leak-free.

EXAMPLE X

Corrugated aluminium radiator fins 23 and half-tubes 24 were prepared and bonded in a similar manner to Example I, as shown in FIG. 7. Only the half-tubes had a copper coating and bonding was carried out using the jig shown in FIG. 6.

This jig comprises end plates 25, between which the fins 23 and half-tubes 24 were located, and rectangular-section supports or fingers 26 which were fitted between the half-tubes and alternating with portions of the fins, enabling sufficiently high contact pressures to be generated on the fin to half-tube joint faces, by pressure of the end plates 25 towards one another, for bonding to occur, the fingers being in compression between each half-tube and the opposite joint face to prevent buckling of the fins. The same conditions of temperature and pressure as in Example I were applied.

EXAMPLE XI

Referring to FIG. 8, this shows a section through a bond formed between aluminium tube sections 27, 28 which were prepared in a similar manner to Example I to produce flare tube joints. Copper was plated only on the inside of the flared 29 of the flare section 27, and the other section 28 of the tube to be bonded was left unplated and was simply turned square on a lathe. Successful leak-tight bonds were produced.

EXAMPLE XII

Referring to FIG. 9, bonds were produced between aluminium flared tubes 30, 31 and return bends 32 prepared as in Example I. The return bend was held in a jig supporting the whole of the top of the bend 32 so as to ensure that the necessary contact pressure could be applied to the bonds without gross deformation occurring. Positive location of the return bends 32 into the flares 33 was ensured by tapering the ends of the return bends to fit into the flares. Only the flares 33 were copper plated. The return bends were pressed against the flared tubes, using the same conditions of temperature, but applying the maximum pressure the bends could sustain without suffering gross deformation, yielding leak-tight bonds.

EXAMPLE XIII

Using essentially the same techniques as for commercially pure aluminium, bonds have also been produced in alloys of aluminium, including HE 30 typically comprising 0.10% max Cu; 0.5–1.2% Mg; 0.7 – 1.3% Si; 0.5% max Fe; 0.4 – 1.05 Mn; 0.25% max Cr; and remainder Al; LM13 (Lo-Ex) typically comprising 0.7 – 1.5% Cu; 0.8 – 1.5% Mg; 10 – 12% Si; 1% max Fe; 0.5% max Mn; 1.5% max Ni; 0.5% max Zn; 0.1% max Pb; 0.15 max Sn; 0.2% max Ti; and remainder Al; and LM 14 (Y alloy) having a melting point which is not lower than high silicon aluminum alloy and typically comprising 3.5 – 4.5% Cu; 1.2 – 1.7% Mg; 1.8 – 2.35 Ni; 0.6% max Mn; 0.1% max Zn; 0.6% max Si; 0.6% max Fe; 0.2% max Ti; 0.05% max Pb; 0.05% max Sn; and remainder Al. In the case of the latter two alloys, which have high alloying additions and correspondingly low melting points, lower maximum temperatures were used during the heat-pressure treatment. With LM13 (Lo-Ex) aluminium casting alloy, bonds with an ultimate tensile stress of about 110MNm$^{-2}$ (7 tons/in$^2$) have been produced by heating to 530° C in a differential expansion jig.

EXAMPLE XIV

Bonds have also been produced between LM13 and a composite consisting of 60% LM14 (Y alloy) and 40% alumina, using a maximum temperature of 525° C. The ultimate tensile strength of the bond was 102MNm$^{-2}$ (6.6 tons/sq. in).

EXAMPLE XV

Cast aluminium alloy pieces prepared as in Example I and having shaped hollow interior configurations, were bonded together under the same conditions of temperature and pressure as in Example I to produce a piston 40 having a hollow annular cooling gallery 41 such as is shown in FIG. 10. Such a method eliminates the need for the core arrangements at present required in casting such structures. The copper layer may be deposited on one or more surfaces of the pieces to be bonded. In such a piston the bonded pieces may be both of the same aluminium alloy or alternatively one piece may be of LM13 alloy and the other piece of LM14 alloy.

EXAMPLE XVI

The invention may be applied to armoured vehicles where the armour is made of plates of aluminium alloy. The plates are prepared as in Example I and are bonded together under appropriate conditions of temperature and pressure in the manner already described to form a composite structure of the vehicle, typical alloys being U.S.A.A. specifications No. 2014 and 2024. This enables the aluminium alloy to be chosen for its strength, ballistic properties and corrosion resistance, and does not limit the aluminium alloys to those that can be successfully welded.

EXAMPLE XVII

The invention may further be applied to the production of a composite aluminium alloy plate such as is shown in FIGS. 11 and 12, and of which one part 34 has a series of parallel grooves 35 and the other plate part 36 is bonded to the first part to close the grooves 35, as is particularly shown in FIG. 12. The plates are prepared as in Example I and the two parts bonded together under the same conditions of temperature and pressure as already described. Such a plate may have a number of applications, for example, it may form part of the plating of an armoured vehicle and the grooves may be used either for conveving different fluids through the vehicle, e.g. hydraulic fluid, or for cooling purposes. In addition to providing passages for fluids, such grooves may improve the ballistic properties of the plates, the extra surfaces acting to damp the shock waves caused by impacting articles.

EXAMPLE XVIII

Test specimens of commercially pure aluminium and aluminium alloy were prepared and bonds were produced using essentially the same techniques as in Example I. In one set of tests, specimen pieces of HE 30 alloy were bonded to the aluminium pieces at temperatures in the range of 560° to 640° C and in another set of tests, specimen pieces of LM 13 alloy were bonded to aluminium pieces at temperatures in the range of 515° to 530° C, one only of the surfaces to be joined being plated with copper in some cases and with both surfaces being plated with copper in other cases. The temperature was determined by the melting point of the lower melting point piece.

EXAMPLE XIX

The surfaces to be joined of a number of separate pairs of test specimens of two pieces of commercially pure aluminium; one piece of commercially pure aluminium and one piece of aluminium alloy; and two pieces of aluminium alloy, were provided with respective co-operating screw-threads and a surface finish of about 0.0013mm (50 microinches) CLA and were then prepared for bonding as in Example I, one or both of the co-operating screw-threads being plated with copper. The thickness of the copper plating, temperature and holding time for the specimens formed of aluminium pieces were as in Examples I to III, for specimens formed of aluminium pieces when the two pieces of aluminium alloy were of LM 13 alloy and LM 14 alloy as in Example XIII and for specimens formed of aluminium and aluminium alloy pieces where the alloy was HE 30 in one case and LM 13 in another case as in Example XVIII, but the contact pressure in all these cases was provided by the action of screwing up the threads, with no pressure needing to be applied other than that due to the screw-threads.

EXAMPLE XX

Test specimens of the kinds set forth in each of Examples I to XIX were prepared using the same techniques as in Example I save that a copper-rich alloy was used as the interlayer material instead of copper.

It will be appreciated that various modifications may be made without departing from the scope of the invention.

We claim:

1. A method of bonding together at least two pieces of aluminium alloy by eutectic diffusion bonding using, between the surfaces to be joined, an interlayer selected from the group consisting of copper and copper-rich alloys including at least about 95% copper and in which said pieces are heated and said surfaces to be joined are pressed together to form a metallurgical bond therebetween, characterized in that at least one of said pieces is of high silicon aluminum alloy and at least one other of said pieces is of an aluminium alloy having a melting point not lower than that of said high silicon aluminum alloy and in that said one piece of high silicon aluminum alloy and said other piece of aluminium alloy are heated to a temperature in the range of about 515° to about 530° C, whereby to form between the joined surfaces a metallurgical bond consisting of a complex alloy of at least said high silicon aluminum alloy and said interlayer.

2. A method as claimed in claim 1, wherein the surfaces to be joined are provided withe a surface finish of 20 to 50 micro inches CLA.

3. A method as claimed in claim 1, wherein the surfaces to be joined are pressed together by the action of co-operating screw-threads on said surfaces.

4. A method as claimed in claim 1 and including the step of pre-shaping at least two of said pieces to be bonded to produce a bonded structure having at least one internal cavity.

5. A method as claimed in claim 1 and including the step of pre-shaping at least two of said pieces to be bonded to produce a bonded structure in the form of a piston.

6. A method as claimed in claim 5, wherein the said another of said pieces is of high silicon aluminum alloy.

7. A method as claimed in claim 5, wherein the said another of said pieces is of LM 14 alloy.

8. A method as claimed in claim 5, including the step of pre-forming co-operating screw-threads on the surfaces to be joined and wherein the surfaces to be joined are pressed together by the action of said co-operating screw-threads.

9. A method as claimed in claim 1 and including the step of pre-shaping at least two of said pieces to be bonded to produce a bonded structure in the form of a piston and with the bonded pieces defining a cavity within the piston.

10. A method as claimed in claim 1, wherein the said another of said pieces is HE30 alloy.

11. A method as claimed in claim 1 and including the steps of pre-shaping two of said pieces to form two plates, preforming grooving in one of said plates and bonding said plates together to close the grooving.

12. A bonded structure comprising at least two pieces of aluminium alloy having between their joined surfaces a metallurgical bond formed by eutectic diffusion bonding using between the surfaces to be joined an interlayer selected from the group consisting of copper and copper rich alloys including at least about 95% copper, characterized in that at least one of said pieces is of high silicon aluminum alloy and at least one other of said pieces is of an aluminium alloy having a melting point not lower than that of said high silicon aluminum alloy and in that said metallurgical bond is formed of a complex alloy consisting at least of said high silicon aluminum alloy and said interlayer.

13. A bonded structure as claimed in claim 12, and in the form of a piston.

14. A bonded structure as claimed in claim 13, wherein the bonded pieces together define a cavity within the piston.

15. A bonded structure as claimed in claim 13, wherein the said another of said pieces is of high silicon aluminum alloy.

16. A bonded structure as claimed in claim 13, wherein said another of said pieces is of LM 14 alloy.

17. A bonded structure as claimed in claim 13, wherein the bonded pieces have co-operating screw-threads on their joined surfaces.

18. A bonded structure as claimed in claim 12, and in the form of a heat exchanger.

19. A bonded structure as claimed in claim 18, wherein the heat exchanger is of the plate type.

20. A bonded structure as claimed in claim 12, wherein the bonded pieces comprises corrugated radiator fins and half tubes.

21. A bonded structure as claimed in claim 12, wherein the bonded pieces comprise two plates of which one has means defining grooving therein and the other is bonded to the grooved plate to close the grooving.

22. A bonded structure as claimed in claim 12, wherein the bonded pieces have co-operating screw-threads on their joined surfaces.

* * * * *